United States Patent
Yoshizawa et al.

(10) Patent No.: US 8,124,562 B2
(45) Date of Patent: *Feb. 28, 2012

(54) THERMAL TRANSFER INK SHEET, INK CARTRIDGE, COATING COMPOSITION FOR DYE LAYER OF THERMAL TRANSFER INK SHEET, AND THERMAL TRANSFER RECORDING METHOD

(75) Inventors: Masataka Yoshizawa, Kanagawa (JP); Naotsugu Muro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 737 days.

This patent is subject to a terminal disclaimer.

(21) Appl. No.: 12/198,456

(22) Filed: Aug. 26, 2008

(65) Prior Publication Data

US 2009/0061350 A1 Mar. 5, 2009

(30) Foreign Application Priority Data

Aug. 31, 2007 (JP) .................................. 2007-226267

(51) Int. Cl.
- B41M 5/035 (2006.01)
- B41M 5/26 (2006.01)
- B41M 5/50 (2006.01)

(52) U.S. Cl. .......... 503/227; 156/235; 428/32.6; 524/81

(58) Field of Classification Search ........................ None
See application file for complete search history.

(56) References Cited

FOREIGN PATENT DOCUMENTS

| | | | |
|---|---|---|---|
| JP | 06-048053 | | 2/1994 |
| JP | 06-316171 | | 11/1994 |
| JP | 07-032742 | * | 2/1995 |
| JP | 07-032747 | * | 2/1995 |
| JP | 10-244764 | | 9/1998 |

OTHER PUBLICATIONS

Office Action dated Jul. 5, 2011 on Japanese Application No. 2007-226267.
Japanese Office Action dated Oct. 4, 2011 in corresponding Japanese Application 2007-226267.

* cited by examiner

*Primary Examiner* — Bruce H Hess
(74) *Attorney, Agent, or Firm* — Sughrue Mion, PLLC

(57) ABSTRACT

A thermal transfer ink sheet having a dye layer containing a polyvinyl acetal modified with a compound of the formula [1] and a polyvinyl acetal modified with a compound of the formula [2]:

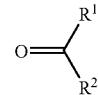

Formula [1]

wherein $R^1$ represents a substituted alkyl group, etc; $R^2$ represents H, etc;

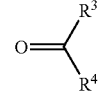

Formula [2]

wherein $R^3$ represents a linear hydrocarbon group, etc; $R^4$ represents a hydrogen atom, etc.

6 Claims, No Drawings

THERMAL TRANSFER INK SHEET, INK CARTRIDGE, COATING COMPOSITION FOR DYE LAYER OF THERMAL TRANSFER INK SHEET, AND THERMAL TRANSFER RECORDING METHOD

BACKGROUND OF THE INVENTION

1. Field of the Invention

The present invention relates to a thermal transfer ink sheet that contains a polyvinyl acetal having a specific structure, and to an ink cartridge, a coating composition for dye layer of thermal transfer ink sheet, and a thermal transfer recording method.

2. Description of the Related Art

These days, in particular, a color image-forming material is the mainstream of an image-recording material; and concretely, inkjet-type recording materials, thermal transfer-type image recording materials, electrophotographic recording materials, transfer-type silver halide photosensitive materials, printing inks and recording pens are much used.

Thermal transfer recording includes a recording system where a thermal transfer material having a thermofusible ink layer formed on a base film (support) is heated with a thermal head to thereby melt the ink for recording on an image-receiving material, and a recording system where a thermal transfer material having a thermo-transferable dye-containing, dye-donating layer formed on a base film is heated with a thermal head to thereby thermally diffuse and transfer the dye onto an image-receiving material. In the latter thermal transfer system, the dye transfer rate may be varied by changing the energy to be applied to the thermal head, therefore facilitating gradation recording, and the system is especially advantageous for high-quality full-color recording.

In the thermal diffusion transfer recording system, a dye-containing thermal transfer sheet (hereinafter this may be referred to as "ink sheet") and a thermal transfer image-receiving sheet (hereinafter this may be referred to as "image-receiving sheet") are put one upon another, then the ink sheet is heated by a thermal head that is controlled for its heat generation by an electric signal, whereby the dye in the ink sheet is transferred onto the image-receiving sheet for image information recording thereon. In this, three colors of cyan, magenta and yellow are recorded as transferred one upon another, thereby attaining transfer recording of a color image having continuous color tone gradation.

The thermal transfer sheet contains an ink polymer that has a role of keeping a dye in the sheet, and heretofore, a polyester resin is used for the ink polymer. Polymer materials capable of forming high-density color images are reported in Japanese Patent No. 3263138 and JP-A 7-32742. However, with the recent tendency in the art toward much advanced speedup in printing, the resin could hardly satisfy both the requirement for speedup in printing and the requirement for photograph-level transfer sensitivity.

SUMMARY OF THE INVENTION

An object of the invention is to provide a thermal transfer ink sheet having high sensitivity and free from image defects, an ink cartridge, a coating composition for dye layer of thermal transfer ink sheet, and a thermal transfer recording method.

The present inventors have assiduously studied and, as a result, have found that the above-mentioned object can be attained by the following constitution:

(1) A thermal transfer ink sheet having, as provided on a support, a dye layer containing a thermo-transferable dye in a resin binder, wherein the dye layer contains at least one polyvinyl acetal modified with a compound represented by the following formula [1], and at least one polyvinyl acetal modified with a compound represented by the following formula [2]:

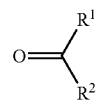

Formula [1]

In formula [1], $R^1$ represents a substituted linear alkyl group, a substituted branched alkyl group, or a substituted or unsubstituted cyclic group; $R^2$ represents a hydrogen atom, a substituted or unsubstituted linear alkyl group, a substituted or unsubstituted branched alkyl group, or a substituted or unsubstituted cyclic group.

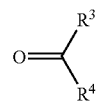

Formula [2]

In formula [2], $R^3$ represents a linear hydrocarbon group having from 2 to 50 carbon atoms, or a branched hydrocarbon group having from 2 to 50 carbon atoms; $R^4$ represents a hydrogen atom, a linear hydrocarbon group having from 1 to 8 carbon atoms, or a branched hydrocarbon group having from 1 to 8 carbon atoms.

(2) The thermal transfer ink sheet of (1), wherein any one of $R^3$ and $R^4$ in formula [2] is a linear hydrocarbon group having from 3 to 20 carbon atoms or a branched hydrocarbon group having from 3 to 20 carbon atoms.

(3) The thermal transfer ink sheet of (1), wherein any one of $R^3$ and $R^4$ in formula [2] is a linear hydrocarbon group having from 3 to 8 carbon atoms or a branched hydrocarbon group having from 3 to 8 carbon atoms.

(4) An ink cartridge filled with a thermal transfer ink sheet of any one of (1) to (3).

(5) A thermal transfer recording method for image formation on an image-receiving sheet having, on a support, a polymer latex-containing ink-receiving layer, which comprises using a thermal transfer ink sheet of any one of (1) to (3).

(6) A coating composition for dye layer of thermal transfer ink sheet, containing a thermo-transferable dye, at least one polyvinyl acetal modified with a compound represented by the following formula [1], and at least one polyvinyl acetal modified with a compound represented by the following formula [2]:

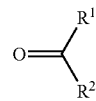

Formula [1]

In formula [1], $R^1$ represents a substituted linear alkyl group, a substituted branched alkyl group, or a substituted or unsubstituted cyclic group; $R^2$ represents a hydrogen atom, a substituted or unsubstituted linear alkyl group, a substituted or unsubstituted branched alkyl group, or a substituted or unsubstituted cyclic group.

Formula [2]

In formula [2], $R^3$ represents a linear hydrocarbon group having from 2 to 50 carbon atoms, or a branched hydrocarbon group having from 2 to 50 carbon atoms; $R^4$ represents a hydrogen atom, a linear hydrocarbon group having from 1 to 8 carbon atoms, or a branched hydrocarbon group having from 1 to 8 carbon atoms.

According to the invention, there are provided a thermal transfer ink sheet having high sensitivity and free from image defects, an ink cartridge, a coating composition for dye layer of thermal transfer ink sheet, and a thermal transfer recording method.

BEST MODE FOR CARRYING OUT THE INVENTION

The invention is described in detail hereinunder.
The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.
[Polyvinyl Acetal]

First described is the polyvinyl acetal for use in the thermal transfer ink sheet of the invention (hereinafter this may be referred to as "polyvinyl acetal" in the invention). In the invention, "acetal" of the polyvinyl acetal is not limited to acetal of the narrow sense of the word, but includes ketal.
(Modification with Compound of Formula [1])

At least one polyvinyl acetal in the in the invention is modified with an aldehyde and/or a ketone of the following formula [1]. As so mentioned in the above, the polyvinyl acetal in the invention also includes a ketal modified with a ketone of formula [1].

Formula [1]

In formula [1], $R^1$ represents a substituted linear alkyl group, a substituted branched alkyl group, or a substituted or unsubstituted cyclic group; $R^2$ represents a hydrogen atom, a substituted or unsubstituted linear alkyl group, a substituted or unsubstituted branched alkyl group, or a substituted or unsubstituted cyclic group.

Preferably, the number or the carbon atoms constituting the substituted linear alkyl group for $R^1$, the substituted branched alkyl group for $R^1$, the substituted or unsubstituted linear alkyl group for $R^2$, and the substituted or unsubstituted branched alkyl group for $R^2$ is from 1 to 10, more preferably from 1 to 5, even more preferably from 1 to 3. The branched alkyl group for $R^1$ and $R^2$ may be branched at any site of the alkyl chain thereof. For example, it may be branched at the carbon atom bonding to the carbonyl group, such as a secondary alkyl group or a tertiary alkyl group; or may be branched at any other carbon atom than that carbon atom (for example, 2-ethylhexyl group, 2,2-dimethylpropyl group).

The cyclic group for $R^1$ and $R^2$ may be any group having a cyclic structure. Typically, it includes an aliphatic carbocyclic group, an aryl group and a heterocyclic group, and these may have a substituent.

The aliphatic carbocyclic group includes an aliphatic carbon-monocyclic group such as a cycloalkyl group or a cycloalkenyl group; a crosslinked cyclic group having crosslinking in the ring, such as a bicyclo ring or a tricyclo ring; and a condensed cyclic group that is condensed with any other ring. The crosslinked ring of the crosslinked cyclic group is preferably a bicyclo[2.2.1]heptane ring, a bicyclo[2.2.1]hept-2-ene ring, and an adamantane ring. The condensed cyclic group is preferably a group formed by condensation of alicyclic rings (preferably 5- or 6-membered, saturated or unsaturated alicyclic rings), or a group formed by condensation of an alicyclic ring and an aromatic ring (preferably phenyl ring) and/or a hetero ring (preferably 5- or 6-membered hetero ring having at least one oxygen atom, nitrogen atom or sulfur atom as the constitutive hetero atom); more preferably a group formed by condensation of a cyclohexane ring with a cyclopentane ring, a cyclohexane ring, cyclohexene ring, a piperidine ring or a benzene ring. As the aliphatic carbocyclic group, a crosslinked alicyclic group or a condensed cyclic group is more preferred to a monocyclic aliphatic carbocyclic group. Even more preferred is a crosslinked alicyclic group or a condensed cyclic group having from 10 to 30 carbon atoms; and still more preferred is a crosslinked cyclic group or a condensed cyclic group having from 10 to 20 carbon atoms.

The aryl group includes a phenyl group, a naphthalene group, an anthracene group and a phenanthrene group; and a phenyl group is preferred.

The heterocyclic group includes an aromatic heterocyclic group, a non-aromatic unsaturated heterocyclic group, and a saturated heterocyclic group. Above all, preferred is an aromatic heterocyclic group.

The cyclic group for $R^1$ and $R^2$ is preferably an aliphatic carbocyclic group, an aryl group or a heterocyclic group, more preferably an aryl group, even more preferably a phenyl group optionally having a substituent. As the cyclic group for $R^1$ and $R^2$, more preferred is a substituted or unsubstituted phenyl group.

The substituent for the alkyl group and the cyclic group may be any substitutable group. The substituent includes, for example, an alkyl group, an alkenyl group, a cycloalkyl group, a cycloalkenyl group, an aryl group, a heterocyclic group, a halogen atom, a nitro group, a cyano group, a mercapto group, a hydroxyl group, an alkoxy group, an aryloxy group, an alkylthio group, an arylthio group, an amino group, an alkylamino group, an arylamino group, a heterocyclic amino group, a hydroxylamino group, an acylamino group, a sulfonamido group, a carbamoyl group, a sulfamoyl group, an acyl group, an acyloxy group, an alkoxycarbonyl group, an aryloxycarbonyl group, a carboxyl group, a sulfo group, an alkylsulfonyl group, an arylsulfonyl group, an ureido group, an urethane group, an alkylsulfonyloxy group, an arylsulfonyloxy group, etc. As the substituent, preferred is an aryl group.

Of the above-mentioned substituents having an alkyl moiety, the alkyl moiety preferably has from 1 to 10 carbon atoms, more preferably from 1 to 5 carbon atoms, even more preferably from 1 to 3 carbon atoms. Of the substituents having an aryl moiety, the aryl moiety preferably has from 6 to 30 carbon atoms, more preferably from 6 to 20 carbon atoms, even more preferably from 6 to 10 carbon atoms. Of the substituents having a hetero ring, the hetero ring preferably has from 4 to 30 carbon atoms, more preferably from 4 to 20 carbon atoms, even more preferably from 5 to 10 carbon atoms. The alkenyl group and the alkynyl group preferably have from 2 to 30 carbon atoms, more preferably from 2 to 20 carbon atoms, even more preferably from 2 to 10 carbon atoms. The cycloalkyl group and the cycloalkenyl group preferably have from 5 to 30 carbon atoms, more preferably from 5 to 20 carbon atoms, even more preferably from 6 to 10 carbon atoms.

In the combination of $R^1$ and $R^2$, preferably, $R^1$ is a substituted linear alkyl group, a substituted branched alkyl group, or a substituted or unsubstituted cyclic group, and $R^2$ is a hydrogen atom; more preferably, $R^1$ is a substituted or unsubstituted cyclic group, and $R^2$ is a hydrogen atom; even more preferably, $R^1$ is a substituted or unsubstituted, crosslinked alicyclic group, a substituted or unsubstituted, condensed cyclic group, or a substituted or unsubstituted aryl group, and $R^2$ is a hydrogen atom; still more preferably, $R^1$ is a substituted or unsubstituted aryl group, and $R^2$ is a hydrogen atom. The aryl group is preferably a phenyl group optionally having a substituent.

Specific examples of the compound of formula [1] are shown below; however, the compound of formula [1] usable in the invention should not be limited to these.

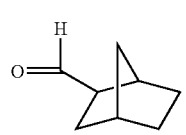

A-1

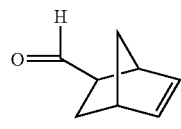

A-2

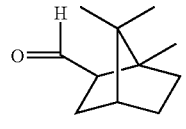

A-3

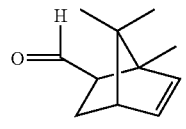

A-4

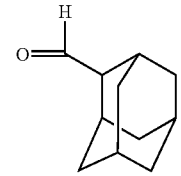

A-5

-continued

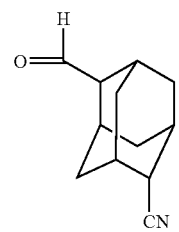

A-6

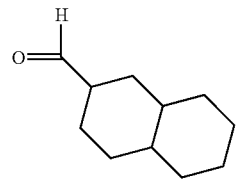

A-7

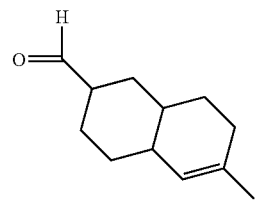

A-8

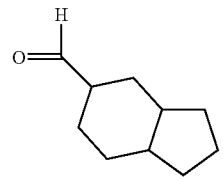

A-9

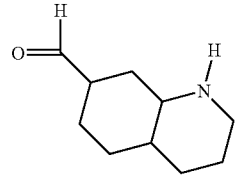

A-10

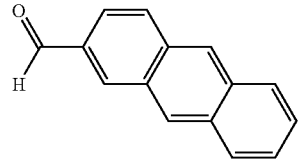

A-11

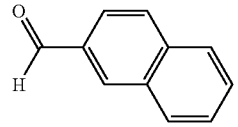

A-12

A-13

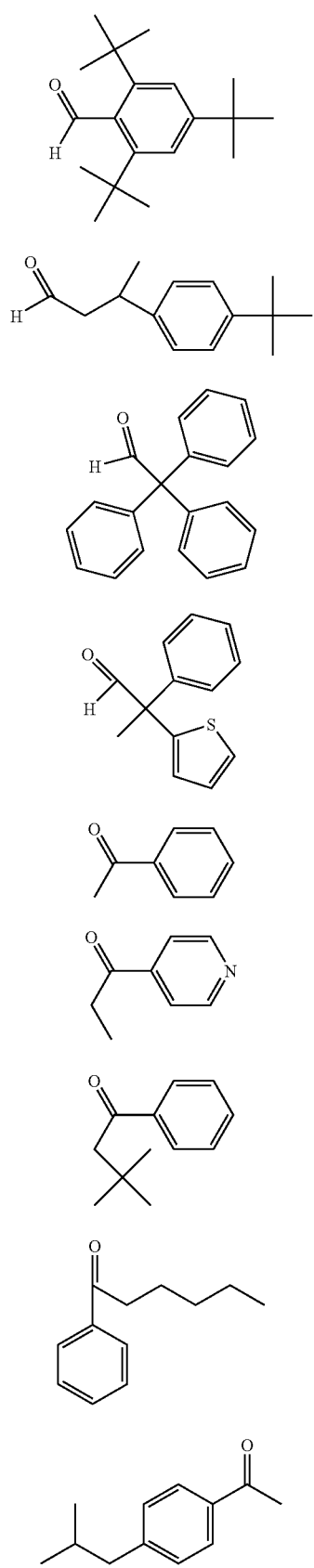
A-14
A-15
A-16
A-17
A-18
A-19
A-20
A-21
A-22
A-23 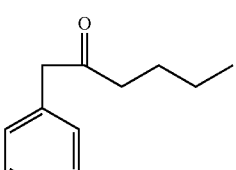
A-24 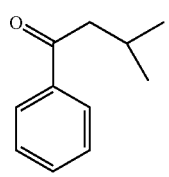
A-25 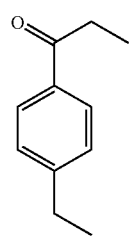
A-26 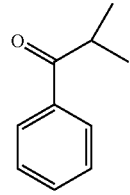
A-27 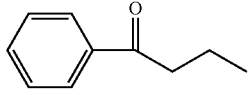
A-28 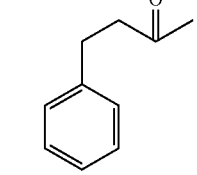
A-29 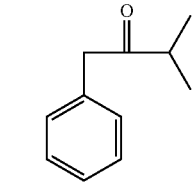
A-30 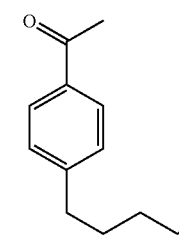

-continued

A-31 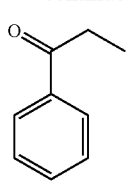

A-32 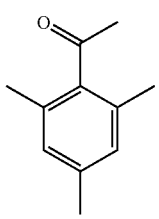

A-33 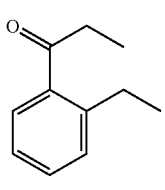

A-34 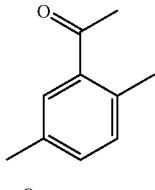

A-35 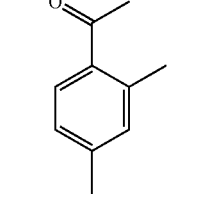

A-36 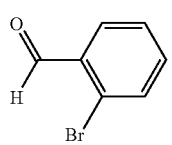

A-37 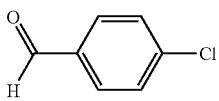

A-38 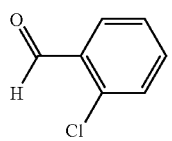

A-39

A-40 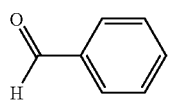

The amount of the compound of formula [1] that constitutes the polyvinyl acetal modified with the compound of formula [1] is preferably from 10% by mass to 100% by mass, based on all the polymerization units constituting the polymer, more preferably from 30% by mass to 95% by mass, even more preferably from 50% by mass to 90% by mass.

If desired, two or more different types of the compounds of formula [1] may be used herein, as combined.

The mass-average molecular weight of the polyvinyl acetal modified with a compound of formula [1] is preferably from 3,000 to 500,000, more preferably from 6,000 to 300,000, even more preferably from 8,000 to 200,000.

The mass-average molecular weight and the molecular weight as referred to herein are the molecular weight represented in terms of polystyrene, as determined through GPC analysis using a column of TSKgel GMHxL, TSKgel G4000HxL or TSKgel G2000HxL (all Tosoh's trade names) and using a solvent of THF with detection with a differential refractiometer.

The polyvinyl acetal modified with a compound of formula [1] is prepared generally by reacting a polyvinyl alcohol with an aldehyde and/or a ketone in water or an organic solvent using an acid catalyst. As the aldehyde and/or the ketone, a compound of formula [1] alone may be used, or a compound of formula [1] may be combined with any other aldehyde and/or ketone not represented by formula [1].

The acid catalyst for acetalization includes inorganic acids such as hydrochloric acid, sulfuric acid and phosphoric acid; acetic acid, p-toluenesulfonic acid, etc. The amount of the catalyst to be used is preferably from 0.005 to 0.2 mols relative to 1 mol of the aldehyde and/or ketone to be used for the reaction.

The acetalization temperature may be generally from 20° C. to 100° C. or so, preferably from 40° C. to 90° C.

Examples of specific structures of polyvinyl acetal modified with a compound of formula [1] are shown below; however, the polyvinyl acetal modified with a compound of formula [1] for use in the invention should not be limited to these. The numerals in the formulae indicate the ratio by mass of the constitutive monomer components. Mw means a mass-average molecular weight.

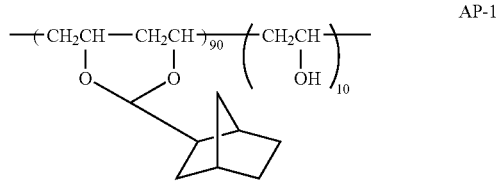
AP-1
Mw150000

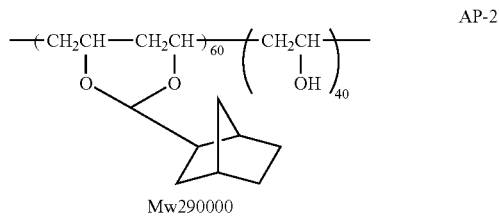
AP-2
Mw290000

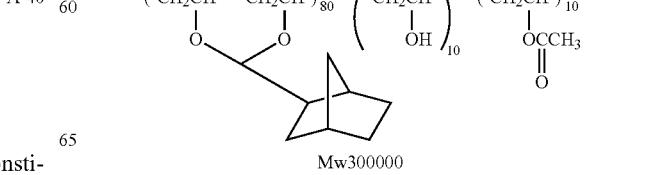
AP-3
Mw300000

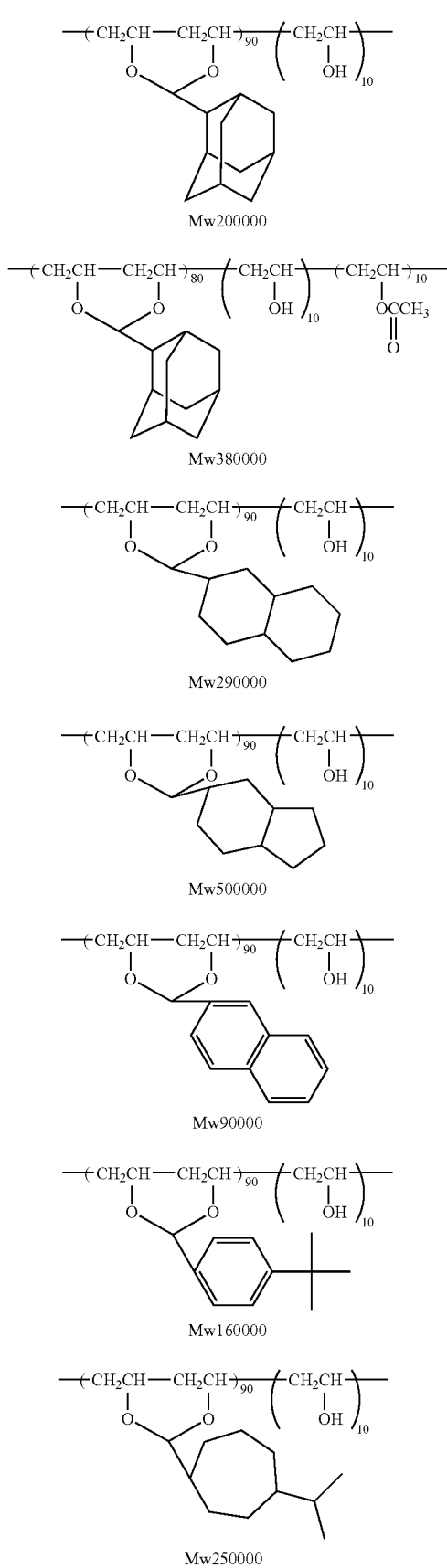
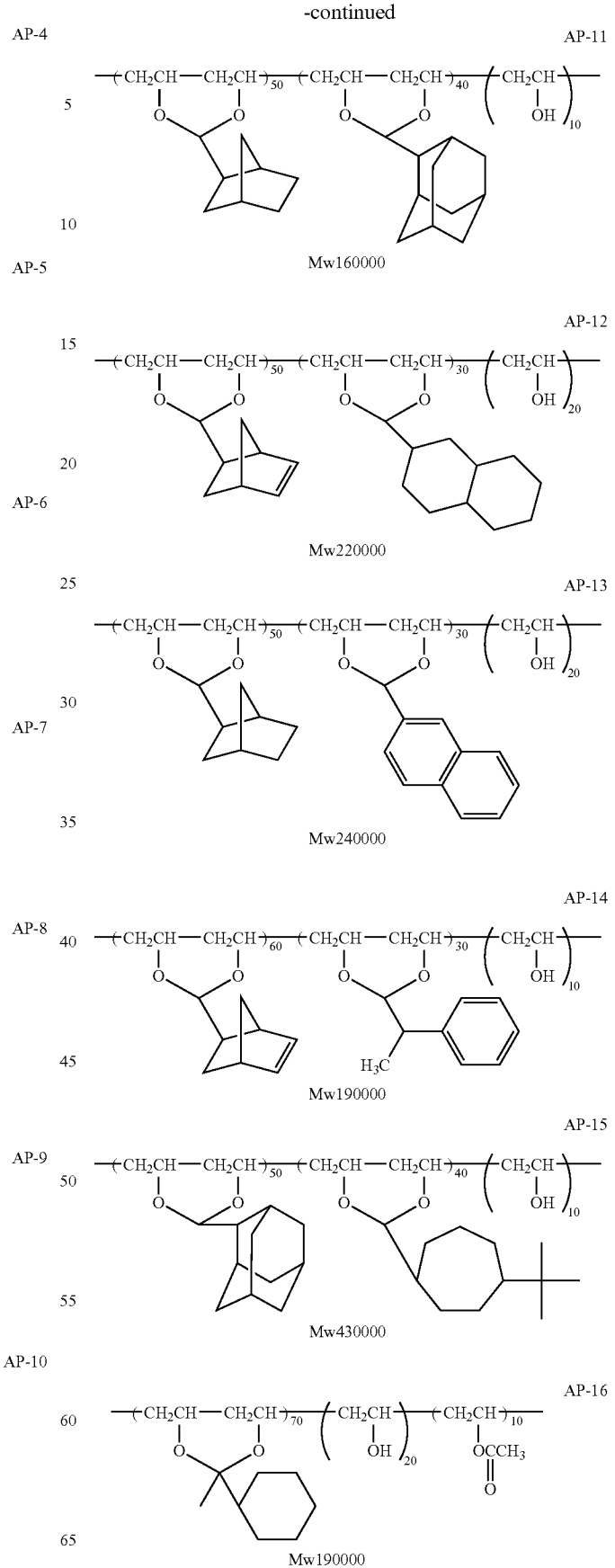

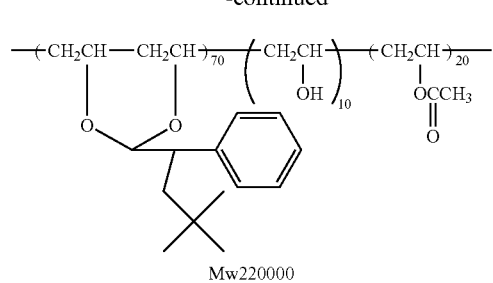
AP-17
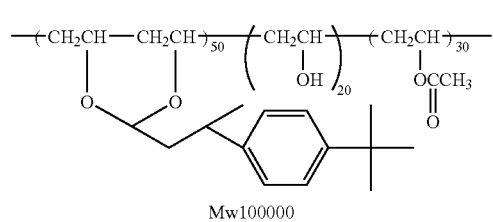
AP-18
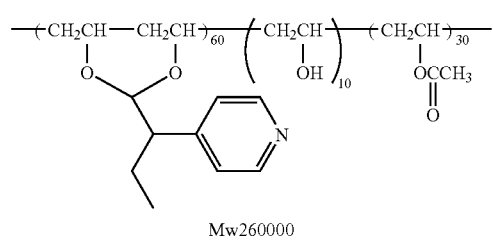
AP-19
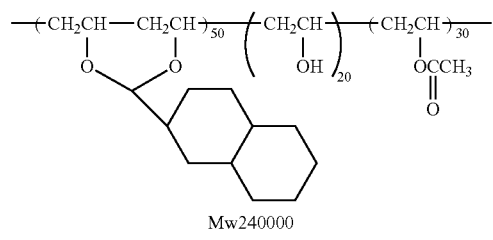
AP-20
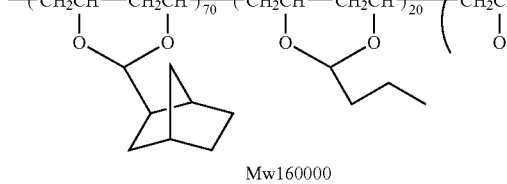
AP-21
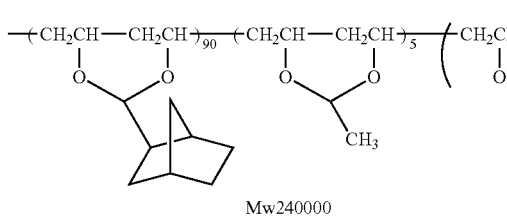
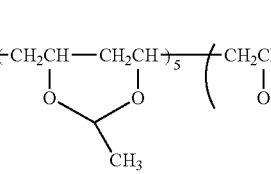
AP-22
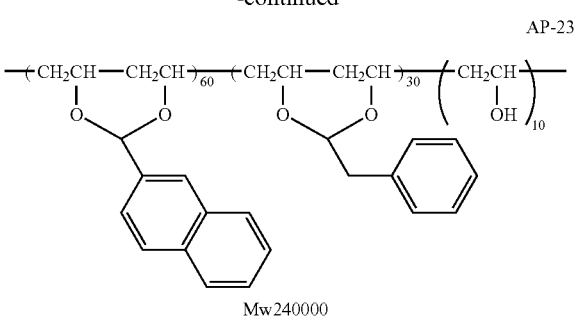
AP-23
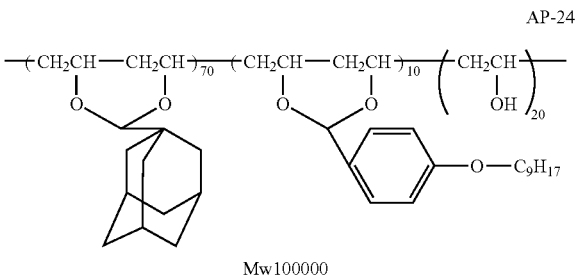
AP-24
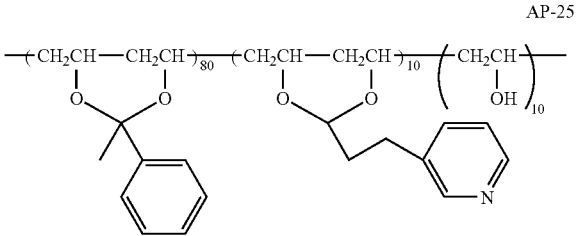
AP-25
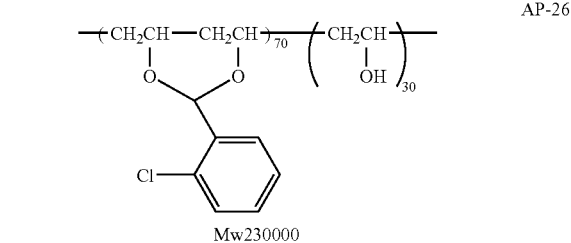
AP-26
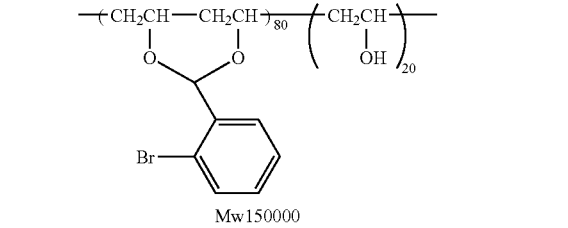
AP-27
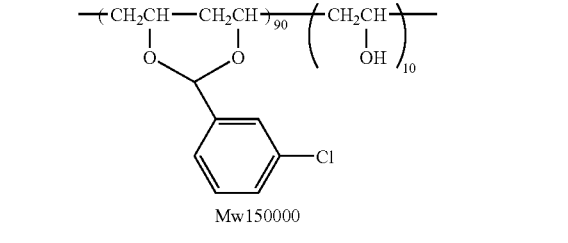
AP-28

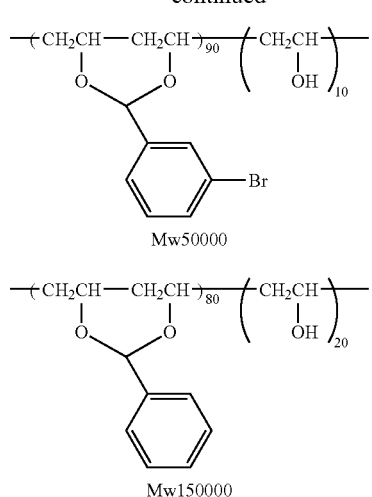

AP-29

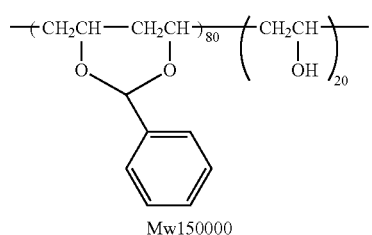

AP-30

(Modification with Compound of Formula [2])

Next described is the polyvinyl acetal for use in the invention modified with an aldehyde and/or a ketone of formula [2]. As so mentioned hereinabove, the polyvinyl acetal includes a ketal modified with a ketone of formula [2].

Formula [2]

In formula [2], $R^3$ represents a linear hydrocarbon group having from 2 to 50 carbon atoms, or a branched hydrocarbon group having from 2 to 50 carbon atoms; $R^4$ represents a hydrogen atom, a linear hydrocarbon group having from 1 to 8 carbon atoms, or a branched hydrocarbon group having from 1 to 8 carbon atoms. The hydrocarbon group includes an alkyl group, an alkenyl group and an alkynyl group. The branched hydrocarbon group may be branched at any site of the hydrocarbon chain thereof. For example, the branched alkyl group may be branched at the carbon atom bonding to the carbonyl group, such as a secondary alkyl group or a tertiary alkyl group; or may be branched at any other carbon atom than that carbon atom.

In formula [2], $R^3$ is preferably a linear hydrocarbon group or a branched hydrocarbon group having from 3 to 20 carbon atoms, more preferably a linear hydrocarbon group or a branched hydrocarbon group having from 3 to 8 carbon atoms, even more preferably a hydrocarbon group having 3 or 4 carbon atoms.

$R^4$ is preferably a linear hydrocarbon group or a branched hydrocarbon group having from 1 to 5 carbon atoms, more preferably a linear hydrocarbon group or a branched hydrocarbon group having from 1 to 3 carbon atoms, even more preferably a hydrogen atom.

Of the linear hydrocarbon group and the branched hydrocarbon group for $R^3$ and $R^4$, preferred is a linear hydrocarbon group, and more preferred is an alkyl group.

Specific examples of the compound of formula [2] are shown below; however, the compound of formula [2] usable in the invention should not be limited to these.

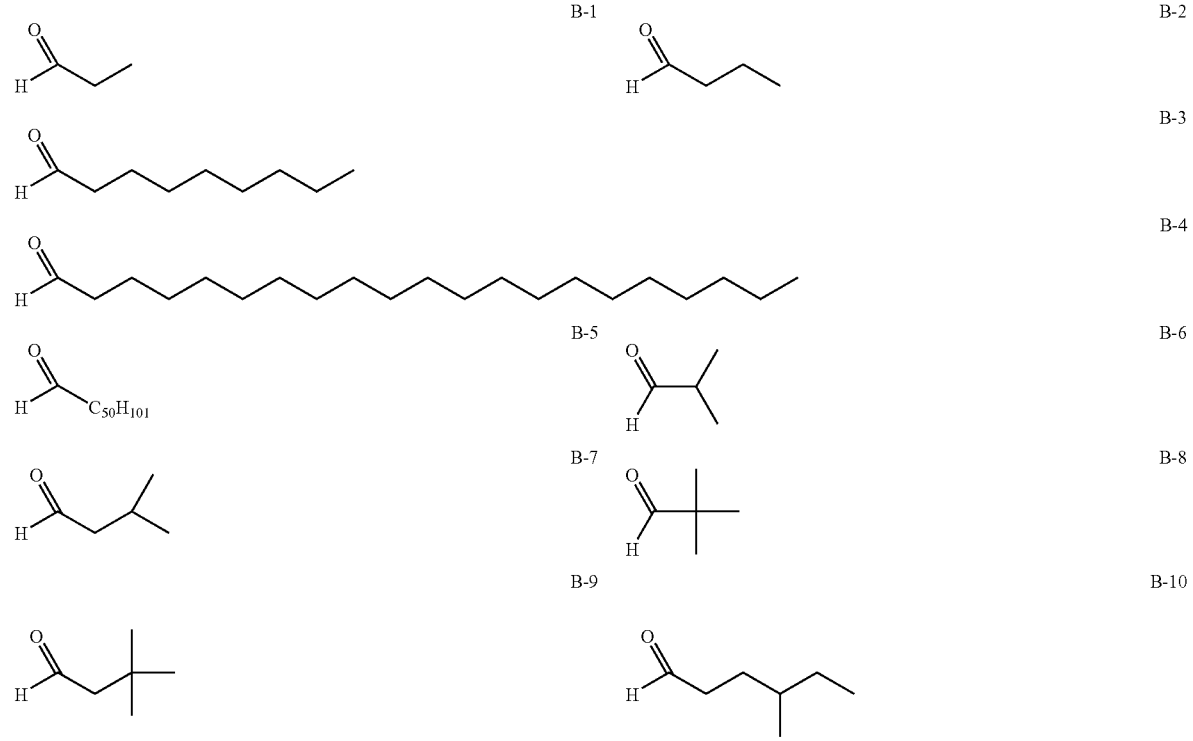

-continued

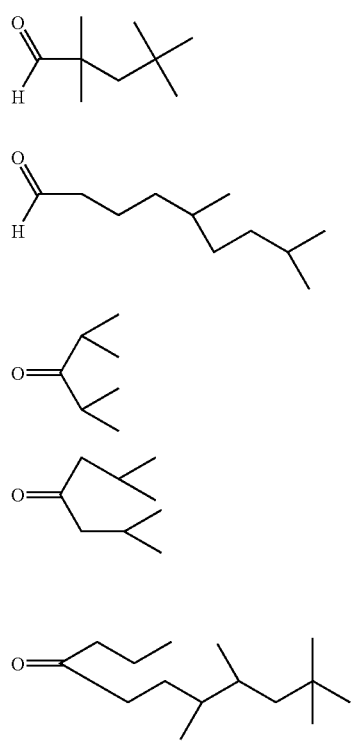

The amount of the compound of formula [2] that constitutes the polyvinyl acetal modified with the compound of formula [2] is preferably from 10% by mass to 100% by mass, based on all the polymerization units constituting the polymer, more preferably from 30% by mass to 95% by mass, even more preferably from 50% by mass to 90% by mass.

If desired, two or more different types of the compounds of formula [2] may be used herein, as combined.

The mass-average molecular weight of the polyvinyl acetal modified with a compound of formula [2] is preferably from 3,000 to 500,000, more preferably from 6,000 to 300,000, even more preferably from 8,000 to 200,000.

The mass-average molecular weight and the molecular weight as referred to herein are the molecular weight represented in terms of polystyrene, as determined through GPC analysis using a column of TSKgel GMHxL, TSKgel G4000HxL or TSKgel G2000HxL (all Tosoh's trade names) and using a solvent of THF with detection with a differential refractiometer.

The polyvinyl acetal modified with a compound of formula [2] is prepared generally by reacting a polyvinyl alcohol with an aldehyde and/or a ketone in water or an organic solvent using an acid catalyst. As the aldehyde and/or the ketone, a compound of formula [2] alone may be used, or a compound of formula [2] may be combined with any other aldehyde and/or ketone not represented by formula [2].

The acid catalyst for acetalization includes inorganic acids such as hydrochloric acid, sulfuric acid and phosphoric acid; acetic acid, p-toluenesulfonic acid, etc. The amount of the catalyst to be used is preferably from 0.005 to 0.2 mols relative to 1 mol of the aldehyde and/or ketone to be used for the reaction.

The acetalization temperature may be generally from 20° C. to 100° C. or so, preferably from 40° C. to 90° C.

Examples of specific structures of polyvinyl acetal modified with a compound of formula [2] are shown below; however, the polyvinyl acetal modified with a compound of formula [2] for use in the invention should not be limited to these. The numerals in the formulae indicate the ratio by mass of the constitutive monomer components. Mw means a mass-average molecular weight.

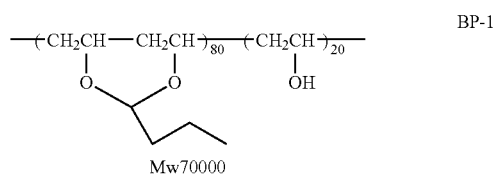

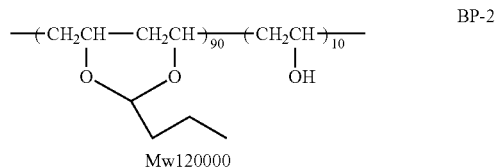

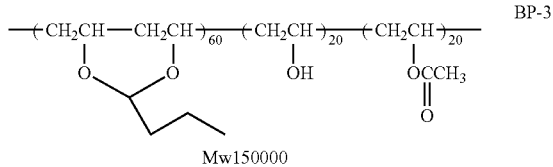

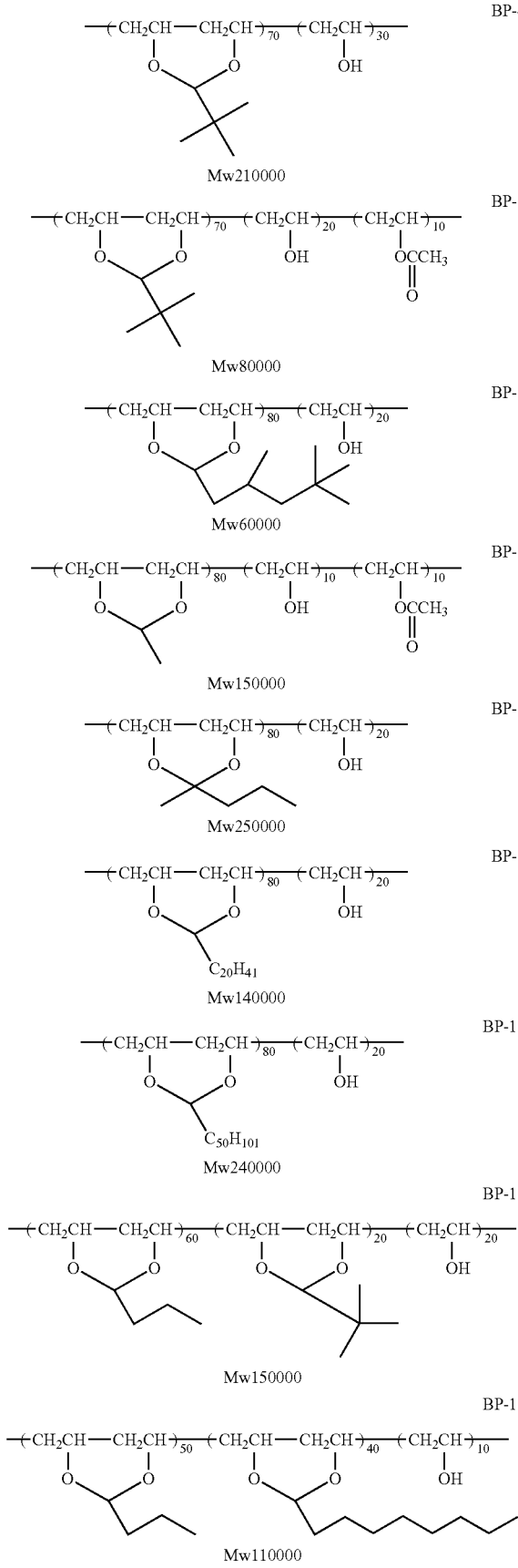
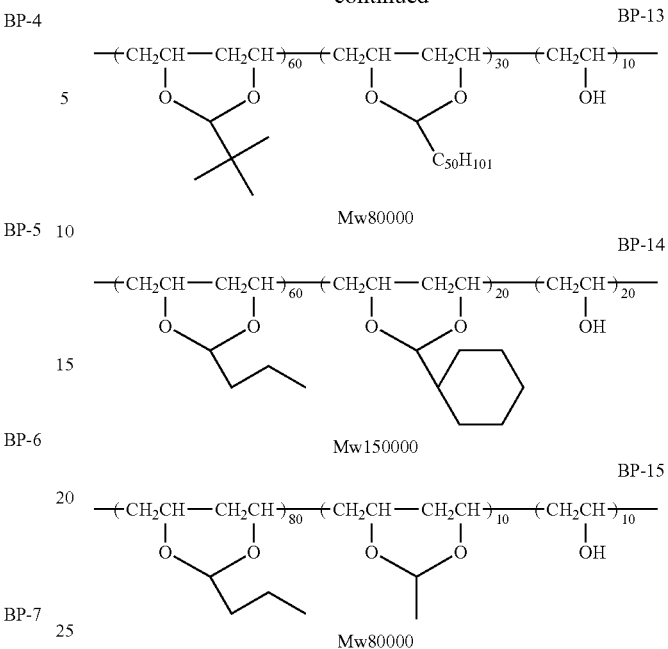

In the invention, polyvinyl acetal modified with a compound of formula [1] and polyvinyl acetal modified with a compound of formula [2] may be combined in any desired ratio by mass; however, for efficiently expressing the effect of the invention, the amount of polyvinyl acetal modified with a compound of formula [2] is from 1 part by mass to 1000 parts by mass relative to 100 parts by mass of the amount of polyvinyl acetal modified with a compound of formula [1].

The combination of polyvinyl acetals mentioned above in the invention may be further combined with any polymer. The additional polymer is preferably transparent or semitransparent and colorless, including natural resins, polymers and copolymers, synthetic resins, polymers and copolymers, and other film-forming media, for example, gelatins, polyvinyl alcohols, hydroxyethyl celluloses, cellulose acetates, cellulose acetate butyrates, polyvinylpyrrolidones, casein, starch, polyacrylic acids, polymethylmethacrylic acids, polyvinyl chlorides, polymethacrylic acids, styrene/maleic anhydride copolymers, styrene/acrylonitrile copolymers, styrene/butadiene copolymers, polyvinyl acetals (e.g., polyvinyl formal and polyvinyl butyral), polyesters, polyurethanes, phenoxy resins, polyvinylidene chlorides, polyepoxides, polycarbonates, polyvinyl acetates, polyolefins, and polyamides. The binder may form a coating film from water or an organic solvent or an emulsion.

[Thermal Transfer Ink Sheet]
(Constitution)

The thermal transfer ink sheet of the invention contains at least one polyvinyl acetal modified with a compound of formula [1] and at least one polyvinyl acetal modified with a compound of formula [2]. The thermal transfer ink sheet generally comprises a dye layer formed on a support, in which the dye layer contains polyvinyl acetal modified with a compound of formula [1], polyvinyl acetal modified with a compound of formula [2] and a thermo-transferable dye.

The thermal transfer ink sheet of the invention may have any other layer than the dye layer, not too much interfering with the effect of the invention. For example, it may have an interlayer between the support and the dye-donating layer, or may have a back layer on the support surface opposite to the dye layer (hereinafter this is referred to as the "back" of the support). The interlayer includes, for example, an undercoat layer, and a diffusion-preventing layer for preventing dye from diffusing toward the support (hydrophilic barrier layer). The back layer is, for example, a heat-resistant slip layer, and this prevents a thermal head from adhering to the ink sheet.
(Support)

For the support of the thermal transfer ink sheet of the invention, any conventional support heretofore employed for ink sheets may be suitably selected and used. For example, the materials described in JP-A 7-137466, paragraph [0050] are favorably used. The thickness of the support is preferably from 2 to 30 μm.
(Dye Layer)

As the dye to be in the dye layer in the invention, any dye is employable, but it must be at least thermo-transferable. The dye usable in the invention is typically a cyan dye, a magenta dye, a yellow dye, a black dye, an IR dye and a UV dye; and depending on the object and for color control, these may be used either singly or as combined.

As the cyan dye, for example, favorably used are those described in JP-A 3-103477 and JP-A 3-150194. As the magenta dye, for example, favorably used are those described in JP-A 5-286268. As the yellow dye, for example, favorably used are those described in JP-A 1-225592.

The amount of the dye in the dye layer is preferably from 0.03 to 1.0 $g/m^2$, more preferably from 0.1 to 0.6 $g/m^2$. The thickness of the dye layer is preferably from 0.2 to 5 μm, more preferably from 0.4 to 2 μm.

The dye layer may contain various known additives, if desired, in addition to the above-mentioned resin binder and dye. The additives include, for example, organic fine particles and inorganic fine particles such as polyethylene wax for improving the releasability from image-receiving sheet and for improving the ink coatability. In addition, a hardening agent (e.g., silane coupling agent) and a release agent may be further mentioned. One preferred example of the release agent is a releasable graft copolymer, and the copolymer is prepared through graft polymerization of a polymer main chain with at least one releasable segment selected from a group consisting of polysiloxane segment, fluorocarbon segment, fluorohydrocarbon segment and long-chain alkyl segment. Of those, especially preferred is a graft copolymer prepared by grafting a main chain of polyvinyl acetal resin with a polysiloxane segment.

The thermal transfer ink sheet of the invention is favorably produced by applying onto a support, a coating composition for dye layer of the invention that contains a thermo-transferable dye, at least one polyvinyl acetal modified with a compound of formula [1] and at least one polyvinyl acetal modified with a compound of formula [2], and suitably drying it to form a dye layer thereon. The coating composition for dye layer of the invention may be produced by dissolving a thermo-transferable dye in a solvent along with at least one polyvinyl acetal modified with a compound of formula [1] and at least one polyvinyl acetal modified with a compound of formula [2] therein, or by dispersing it in a solvent as fine particles. The coating composition for dye layer of the invention may contain the above-mentioned additives, hardening agent and release agent. The coating composition for dye layer of the invention may be applied onto a support according to a known method of, for example, a gravure printing method, a screen printing method, or a reverse roll coating method with a gravure plate.

In case where the invention is applied to a thermal transfer recording material that enables full color image recording, preferably, a cyan dye layer containing a thermo-transferable cyan dye capable of forming a cyan image, a magenta dye layer containing a thermo-transferable magenta dye capable of forming a magenta image, and a yellow dye layer containing a thermo-transferable yellow dye capable of forming a yellow image are formed in order on the surface of a support according to a coating method. If desired, a dye layer containing a black image-forming substance may be additionally formed thereon also according to a coating method.

Also preferably, a protective layer transfer layer may be formed on the support according to a coating method.
(Filling in Ink Cartridge)

The thermal transfer ink sheet of the invention may be filled in an ink cartridge. Regarding the structure of ink cartridge and the filling method into it, those heretofore employed in the field of thermal transfer recording may be employed in the invention. Concretely, the technique of ink cartridge described in JP-UM-A 63-161851, 63-161851 and 1-101864 is also applicable to the invention. In particular, those described in JP-UM-A 1-101864 are more preferred.
[Thermal Transfer Recording]

In thermal transfer recording with the thermal transfer ink sheet of the invention, it is combined with a heating means such as thermal head and an image-receiving sheet. Specifically, thermal energy is given to an ink sheet from a thermal head according to an image-recording signal, and the dye in the part given the thermal energy is transferred onto the image-receiving sheet and fixed thereon to attain image recording.

Next described is the image-receiving sheet to be combined with the ink sheet of the invention.
[Image-Receiving Sheet]

Herein described is a thermal transfer image-receiving sheet to be combined with the thermal transfer ink sheet of the invention.
(Layer Constitution)

The thermal transfer image-receiving sheet comprises a dye-receiving layer (this may be simply referred to as "receiving layer") on a support. Preferably, an undercoat layer is formed between the receiving layer and the support; and, for example, white control layer, a charge control layer, an adhesive layer and a primer layer may be formed. Also preferably, a heat-insulating layer is formed between the undercoat layer and the support. The layer existing between the support and the receiving layer may be referred to simply as "interlayer", and this includes the above-mentioned undercoat layer and heat-insulating layer. The thermal transfer image-receiving layer contains at least one receiving layer and at least one interlayer. On the back of the support, preferably formed are a curl control layer, a writing layer and a charge control layer.
(Receiving Layer)

The receiving layer plays a role of receiving the dye that has transferred from an ink sheet and keeping the formed image. Accordingly, an easily dyeable resin (dyeable receiving polymer) is used in the receiving layer. For it, for example, usable are polyolefin resins such as polyethylene and polypropylene; halogenated resins such as polyvinyl chloride and polyvinylidene chloride; vinylic resins such as polyvinyl acetate and polyacrylate; their copolymers; as well as polyester resins such as polyethylene terephthalate and polybutylene terephthalate; polystyrene resins, polyamide resins, polycarbonates, phenolic resins, polyurethanes, epoxy resins, polysulfones, butyral resins, melamine resins, polyvinyl alcohols; copolymers of olefin such as ethylene or propylene and other vinylic monomer; vinyl chloride/vinyl acetate copolymers, styrene/acryl copolymers, ionomers, cellulose resins, natural rubbers, and synthetic rubbers, either as a single material or a mixture thereof; however, these are not limitative. Preferably, the receiving polymer for use in the receiving layer forms its latex.

(Polymer Latex)

The polymer latex usable in the receiving layer is described. In the thermal transfer image-receiving sheet, the polymer latex usable in the receiving layer is a dispersion of a water-insoluble hydrophobic polymer dispersed in a water-soluble dispersion medium as fine particles therein. The dispersion may be any one prepared by emulsifying a polymer in a dispersion medium, one prepared by emulsification and polymerization, one prepared by micelle dispersion, or a molecular dispersion of polymer molecules partially having a hydrophilic structure, in which the molecular chains themselves are molecularly dispersed. The polymer latex is described, for example, in Taira Okuda & Hiroshi Inagaki, "Synthetic Resin Emulsion", issued by the Polymer Publishing, 1978; Takaaki Sugimura, Yasuo Kataoka, Soichi Suzuki, & Keiji Kasahara, "Applications of Synthetic Latex", issued by the Polymer Publishing, 1993; Soichi Muroi, "Chemistry of Synthetic Latex", issued by the Polymer Publishing, 1970; Yoshiaki Miyosawa, "Development and Application of Water-Base Coating Material", by CMC, 2004; and JP-A 64-538. The mean particle size of the dispersion particles is preferably within a range of from 1 to 50000 nm, more preferably from 5 to 1000 nm. The particle size distribution of the dispersion particles is not specifically defined, and the particles may have a broad particle size distribution or may have a monodispersion particle size distribution.

The polymer latex may be an ordinary uniform-structured polymer latex, and in addition, it may also be a core/shell-structured polymer latex. In the latter case, it is often desirable that the core and the shell have a different glass transition temperature. The glass transition temperature of the polymer latex for use in the invention is preferably from −30° C. to 130° C., more preferably from 0° C. to 100° C., even more preferably from 10° C. to 80° C.

As the preferred embodiments of polymer latex, favorably used herein are hydrophobic polymers such as acrylic polymers, polyesters, rubbers (e.g., SBR resin), polyurethanes, polyvinyl chlorides, polyvinyl acetates, polyvinylidene chlorides and polyolefins. These polymers may be linear polymers, or branched polymers, or crosslinked polymers; or may also be homopolymers formed by polymerization of a single monomer or copolymers formed by copolymerization of two or more different monomers. The copolymers may be random copolymers or block copolymers. Preferably, the number-average molecular weight of the polymer is from 5000 to 1000000, more preferably from 10000 to 500000. In case where a polymer having a too small molecular weight is used, the mechanical strength of the layer containing the polymer latex may be insufficient; but when a polymer having a too large molecular weight is used, then it is unfavorable since its film formability is poor. A crosslinked polymer latex is also preferably used in the invention.

Not specifically defined, the monomer for use in producing the polymer latex may be any one capable of polymerizing in an ordinary radical polymerization or ionic polymerization method. For example, preferred are those of the following monomer groups (a) to (j). From these monomers, any ones may be independently suitably selected and combined and used in producing the polymer latex for use herein.

—Monomer Groups (a) to (j)—

(a) Conjugated dienes: 1,3-pentadiene, isoprene, 1-phenyl-1,3-butadiene, 1-α-naphthyl-1,3-butadiene, 1-β-naphthyl-1,3-butadiene, cyclopentadiene, etc.

(b) Olefins: ethylene, propylene, vinyl chloride, vinylidene chloride, 6-hydroxy-1-hexene, 4-pentenoic acid, methyl 8-nonenoate, vinylsulfonic acid, trimethylvinylsilane, trimethoxyvinylsilane, 1,4-divinylcyclohexane, 1,2,5-trivinylcyclohexane, etc.

(c) α,β-unsaturated carboxylates: alkyl acrylates (e.g., methyl acrylate, ethyl acrylate, butyl acrylate, cyclohexyl acrylate, 2-ethylhexyl acrylate, dodecyl acrylate), substituted alkyl acrylates (e.g., 2-chloroethyl acrylate, benzyl acrylate, 2-cyanoethyl acrylate), alkyl methacrylates (e.g., methyl methacrylate, butyl methacrylate, 2-ethylhexyl methacrylate, dodecyl methacrylate), substituted alkyl methacrylates (e.g., 2-hydroxyethyl methacrylate, glycidyl methacrylate, glycerin monomethacrylate, 2-acetoxyethyl methacrylate, tetrahydrofurfuryl methacrylate, 2-methoxyethyl methacrylate, polypropylene glycol monomethacrylate (molar number of added polyoxypropylene=2 to 100), 3-N,N-dimethylaminopropyl methacrylate, chloro-3-N,N,N-trimethylammoniopropyl methacrylate, 2-carboxyethyl methacrylate, 3-sulfopropyl methacrylate, 4-oxysulfobutyl methacrylate, 3-trimethoxysilylpropyl methacrylate, allyl methacrylate, 2-isocyanatoethyl methacrylate), unsaturated dicarboxylic acid derivatives (e.g., monobutyl maleate, dimethyl maleate, monomethyl itaconate, dibutyl itaconate), polyfunctional esters (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate, 1,2,4-cyclohexane tetraacrylate), etc.

(d) α,β-unsaturated carboxylic acid amides: for example, acrylamide, methacrylamide, N-methylmethacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetacetoxyethyl)acrylamide, N-acryloylmorpholine, diacetonacrylamide, itaconic acid diamide, N-methylmaleimide, 2-acrylamide-methylpropanesulfonic acid, methylenebisacrylamide, dimethacryloylpiperazine, etc.

(e) Unsaturated nitriles: acrylonitrile, methacrylonitrile, etc.

(f) Styrene and its derivatives: styrene, vinyltoluene, p-tert-butylstyrene, vinylbenzoic acid, methyl vinylbenzoate, α-methylstyrene, p-chloromethylstyrene, vinylnaphthalene, p-hydroxymethylstyrene, sodium p-styrenesulfonate, potassium p-styrenesulfinate, p-aminomethylstyrene, 1,4-divinylbenzene, etc.

(g) Vinyl ethers: methyl vinyl ether, butyl vinyl ether, methoxyethyl vinyl ether, etc.

(h) Vinyl esters: vinyl acetate, vinyl propionate, vinyl benzoate, vinyl salicylate, vinyl chloroacetate, etc.

(i) α,β-unsaturated carboxylic acids and their salts: acrylic acid, methacrylic acid, itaconic acid, maleic acid, sodium acrylate, ammonium methacrylate, potassium itaconate.

(j) Other polymerizing monomers: N-vinylimidazole, 4-vinylpyridine, N-vinylpyrrolidone, 2-vinyloxazoline, 2-isopropenyloxazoline, divinylsulfone, etc.

Polymer latex is commercially available, and the following polymers are usable. Examples of acrylic polymers are Daicel Chemical Industry's Sevian A-4635, 4718, 4601; Nippon Zeon's Nipol Lx811, 814, 821, 820, 855 (P-17: Tg 36° C.), 857x2 (P-18: Tg 43° C.); Dai-Nippon Ink Chemical's Voncoat R3370 (P-19: Tg 25° C.), 4280 (P-20: Tg 15° C.), Nippon Pure Chemicals' Jurymer ET-410 (P-21: Tg 44° C.), JSR's AE116 (P-22: Tg 50° C.), AE119 (P-23: Tg 55° C.), AE121 (P-24: Tg 58° C.), AE125 (P-25: Tg 60° C.), AE134 (P-26: Tg 48° C.), AE137 (P-27: Tg 48° C.), AE140 (P-28: Tg 53° C.), AE173 (P-29: Tg 60° C.), Toa Gosei's Aron A-104 (P-30: Tg 45° C.), Takamatsu Yushi's NS-600X, NS-620X, Nisshin Chemical Industry's Vinybran 2580, 2583, 2641, 2770, 2770H, 2635, 2886, 5202C, 2706 (all trade names).

Examples of polyesters are Dai-Nippon Ink Chemical's FINETEX ES650, 611, 675, 850, Eastman Chemical's WD-size, WMS, Takamatsu Yushi's A-110, A-115GE, A-120, A-121, A-124GP, A-124S, A-160P, A-210, A-215GE, A-510, A-513E, A-515GE, A-520, A-610, A-613, A-615GE, A-620, WAC-10, WAC-15, WAC-17XC, WAC-20, S-110, S-110EA, S-111SL, S-120, S-140, S-140A, S-250, S-252G, S-250S, S-320, S-680, DNS-63P, NS-122L, NS-122LX, NS-244LX, NS-140L, NS-141LX, NS-282LX, Toa Gosei's Aron Melt PES-1000 Series, PES-2000 Series, Toyobo's Vylonal MD-1100, MD-1200, MD-1220, MD-1245, MD-1250, MD-1335, MD-1400, MD-1480, MD-1500, MD-1930, MD-1985, Sumitomo Seika's Ceporjon ES (all trade names).

Examples of polyurethanes are Dai-Nippon Ink Chemical's HYDRAN AP10, AP20, AP30, AP40, 101H, Vondic 1320NS, 1610NS, Dainichi Seika's D-1000, D-2000, D-6000, D-4000, D-9000, Takamatsu Yushi's NS-155X, NS-310A, NS-310X, NS-311X, Dai-ichi Kogyo Pharmaceutical's Elastron (all trade names).

Examples of rubbers are LACSTAR 7310K, 3307B, 4700H, 7132C (all by Dai-Nippon Ink Chemical), Nipol Lx416, LX410, LX430, LX435, LX110, LX415A, LX438C, 2507H, LX303A, LX407BP Series, V1004, MH5055 (all by Nippon Zeon) (all trade names).

Examples of polyvinyl chlorides are Nippon Zeon's G351, G576, Nisshin Chemical Industry's Vinybran 240, 270, 277, 375, 386, 609, 550, 601, 602, 630, 660, 671, 683, 680, 680S, 681N, 685R, 277, 380, 381, 410, 430, 432, 860, 863, 865, 867, 900, 900GT, 938, 950 (all trade names). Examples of polyvinylidene chlorides are Asahi Kasei's L502, L513, Dai-Nippon Ink Chemical's D-5071 (all trade names). Examples of polyolefins are Mitsui Petrochemical's Chemipearl S120, SA100, V300 (P-40: Tg 80° C.), Dai-Nippon Ink Chemical's Voncoat 2830, 2210, 2960, Sumitomo Seika's Zaikthene, Ceporjon G; and examples of copolymer nylons are Sumitomo Seika's Ceporjon PA (all trade names).

Examples of polyvinyl acetates are Nisshin Chemical Industry's Vinybran 1080, 1082, 1085W, 1108W, 1108S, 1563M, 1566, 1570, 1588C, A22J7-F2, 1128C, 1137, 1138, A20J2, A23J1, A23J1, A23K1, A23P2E, A68J1N, 1086A, 1086, 1086D, 1108S, 1187, 1241LT, 1580N, 1083, 1571, 1572, 1581, 4465, 4466, 4468W, 4468S, 4470, 4485LL, 4495LL, 1023, 1042, 1060, 1060S, 1080M, 1084W, 1084S, 1096, 1570K, 1050, 1050S, 3290, 1017AD, 1002, 1006, 1008, 1107L, 1225, 1245L, GV-6170, GV-6181, 4468W, 4468S (all trade names).

One or more these polymer latexes may be used herein either singly or as combined.

Specific examples of the structures of polymer latexes usable in the invention are shown below; however, the polymer latex usable in the invention should not be limited to these. The numerals in the formulae indicate the ratio by mass of the constitutive monomer components. Mw means a mass-average molecular weight.

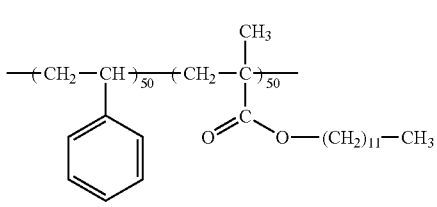

P-1

Mw 95000

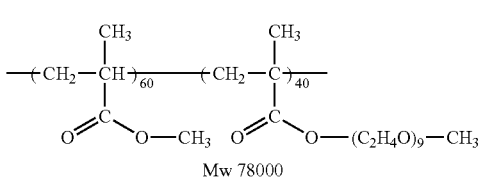

P-2

Mw 78000

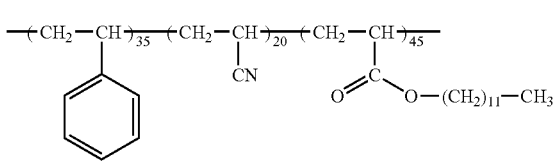

P-3

Mw 55000

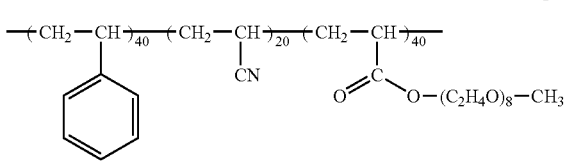

P-4

Mw 48000

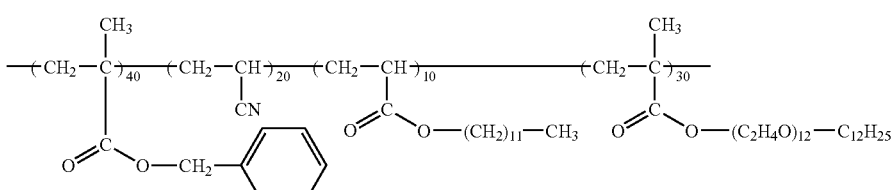

P-5

Mw 69000

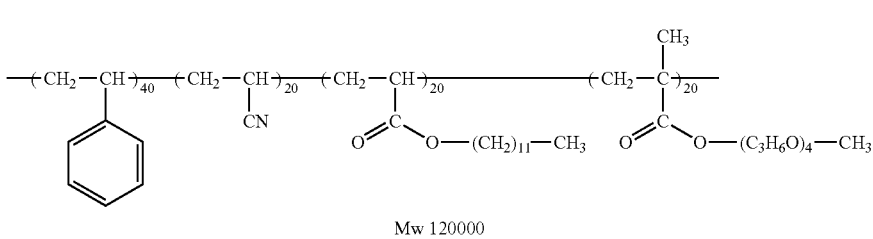

P-6

Mw 120000

-continued
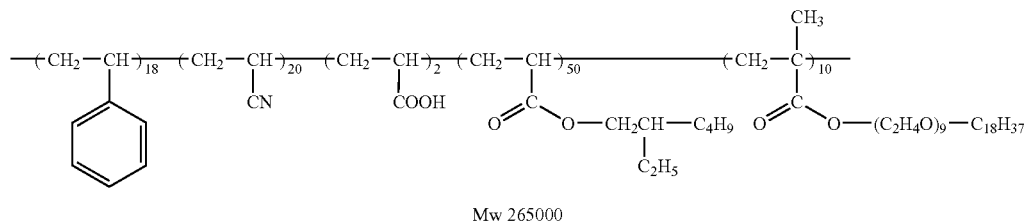
P-7
Mw 265000
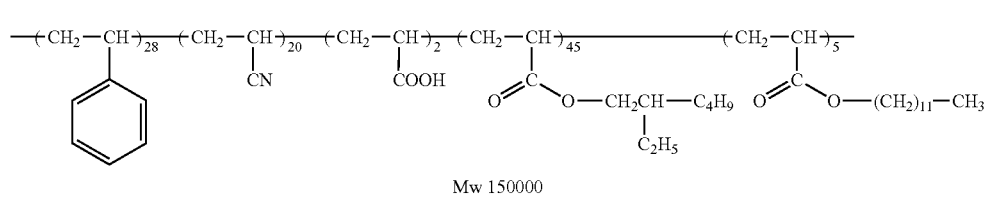
P-8
Mw 150000
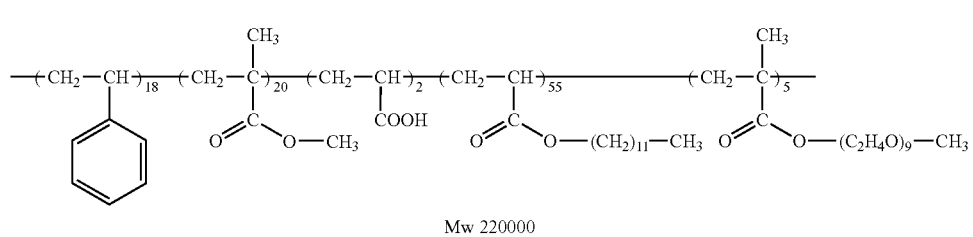
P-9
Mw 220000
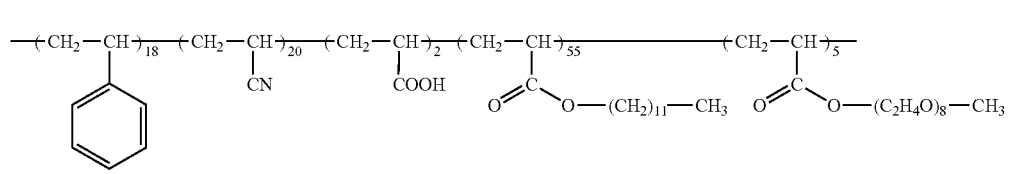
P-10
Mw 185000
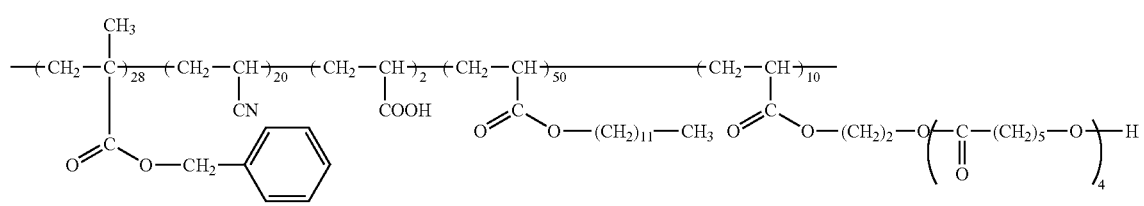
P-11
Mw 320000
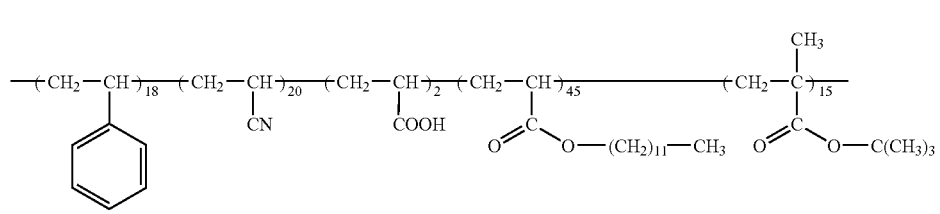
P-12
Mw 110000
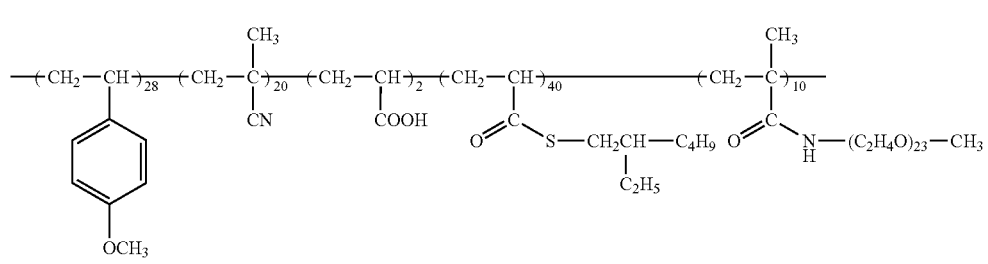
P-13
Mw 95000

-continued
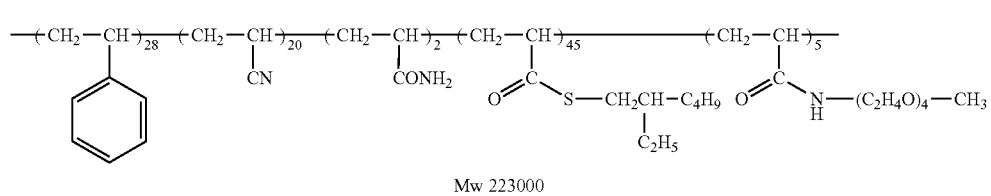
P-14
Mw 223000
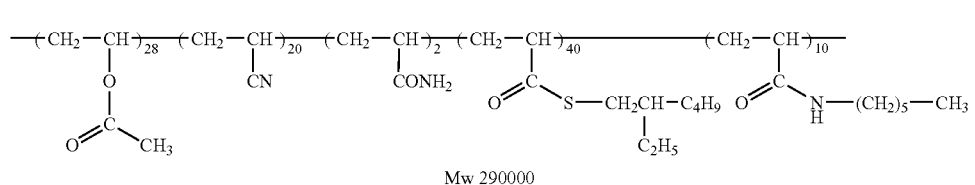
P-15
Mw 290000
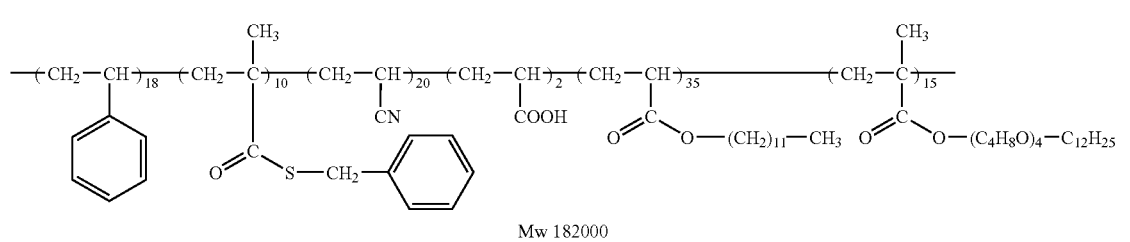
P-16
Mw 182000
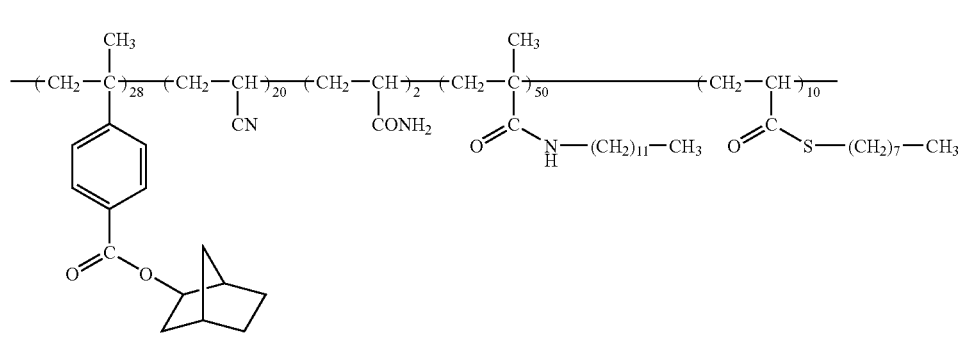
P-17
Mw 186000
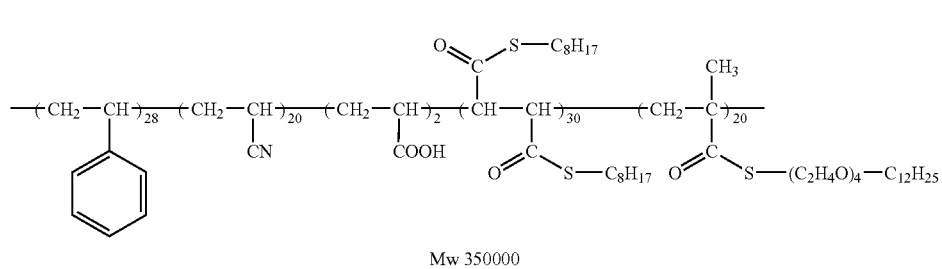
P-18
Mw 350000
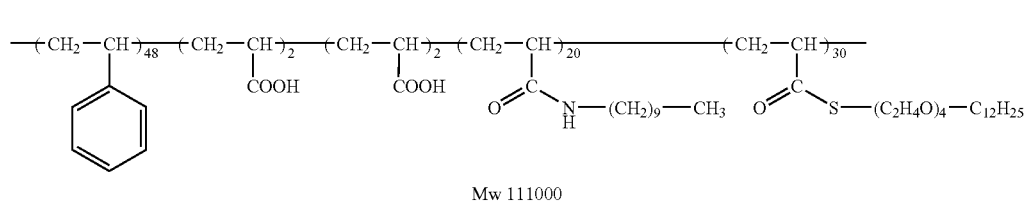
P-19
Mw 111000
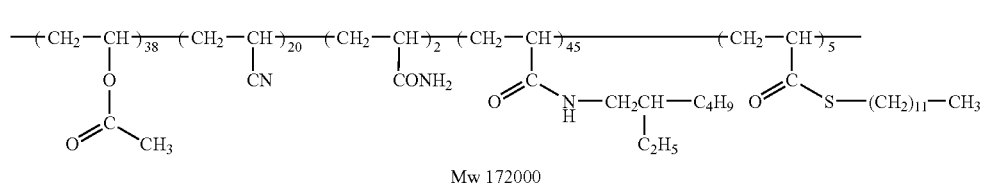
P-20
Mw 172000

-continued

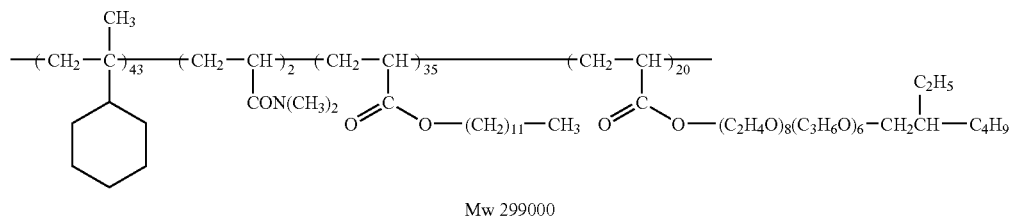

Mw 299000

P-21

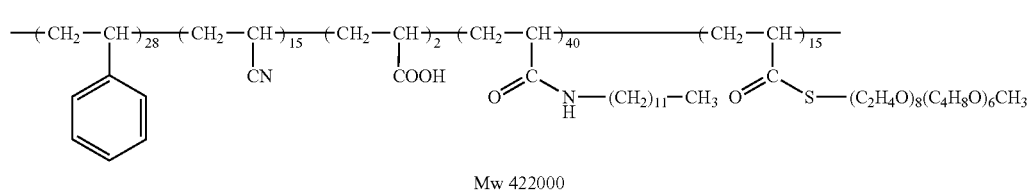

Mw 422000

P-22

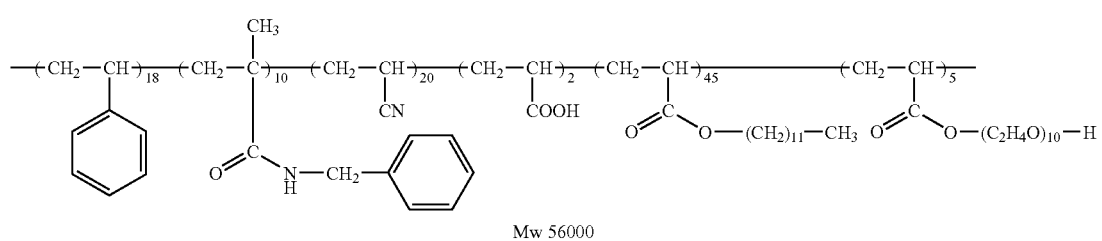

Mw 56000

P-23

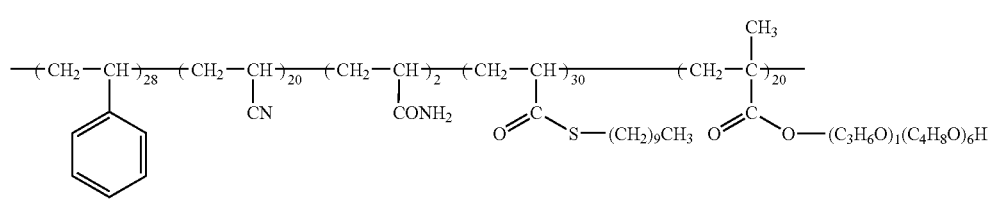

Mw 250000

P-24

EXAMPLES

The characteristics of the invention are described more concretely with reference to the following Examples. In these Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Production Examples

Production of AP-1

Polyvinyl alcohol (PVA110, by Kuraray) (20 g), methylene chloride (400 g), hydrochloric acid (2.0 g) and A-1 (93 g) were put into a reactor equipped with a stirrer and a reflux condenser, and heated at 40° C. for 40 hours to complete the reaction. Next, the reaction liquid was reprecipitated in methanol to obtain a reaction product. Its mass-average molecular weight was $1.5 \times 10^6$.

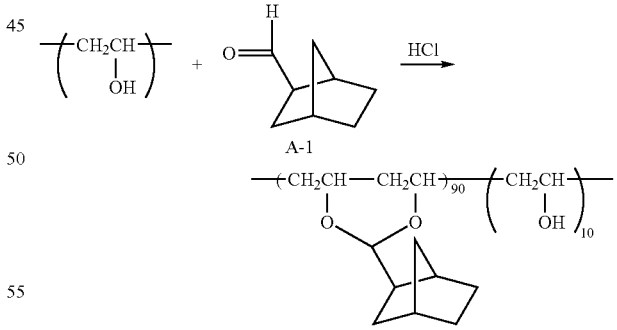

Production of AP-2 to AP-30

AP-2 to AP-30 were produced in the same manner as that for AP-1.

Production of BP-1 to BP-15

BP-1 to BP-15 were produced in the same manner as that for AP-1.

Example 1

Fabrication of Ink Sheet (1) Fabrication of Sample 101 (the Invention):

A polyester film (Lumirror, trade name by Toray) having a thickness of 6.0 μm was used as a support. A heat-resistant slip layer (thickness 1 μm) was formed on the back of the film, and to its surface, yellow, magenta and cyan compositions mentioned below were applied each as single color (coating amount of the dry film, 1 g/m$^2$).

Yellow Ink:

| | |
|---|---|
| Dye (Macrolex Yellow 6G, trade name by Bayer) | 5.5 mas. pts. |
| Polymer AP-1 | 2.2 mas. pts. |
| Polymer BP-1 | 2.2 mas. pts. |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polymer AP-1 | 2.2 mas. pts. |
| Polymer BP-1 | 2.2 mas. pts. |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polymer AP-1 | 2.2 mas. pts. |
| Polymer BP-1 | 2.2 mas. pts. |
| Methyl ethyl ketone/toluene (1/1 by mass) | 90 mas. pts. |

(2) Fabrication of Sample 102 (the Invention):

A polyester film (Lumirror, trade name by Toray) having a thickness of 6.0 μm was used as a support. A heat-resistant slip layer (thickness 1 μm) was formed on the back of the film, and to its surface, yellow, magenta and cyan compositions mentioned below were applied each as single color (coating amount of the dry film, 1 g/m$^2$).

Yellow Ink:

| | |
|---|---|
| Dye (Macrolex Yellow 6G, trade name by Bayer) | 5.5 mas. pts. |
| Polymer AP-1 | 3.3 mas. pts. |
| Polymer BP-1 | 1.1 mas. pts. |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polymer AP-1 | 3.3 mas. pts. |
| Polymer BP-1 | 1.1 mas. pts. |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polymer AP-1 | 3.3 mas. pts. |
| Polymer BP-1 | 1.1 mas. pts. |
| Methyl ethyl ketone/toluene (1/1 by mass) | 90 mas. pts. |

(3) Fabrication of Sample 103 (the Invention):

A sample 103 of the invention was fabricated in the same manner as that for the sample 101, for which, however, the compound AP-1 was changed to AP-13 and BP-1 to BP-5.

(4) Fabrication of Sample 104 (the Invention):

A sample 104 of the invention was fabricated in the same manner as that for the sample 101, for which, however, the compound AP-1 was changed to AP-26 and BP-1 to BP-9.

(5) Fabrication of Sample 105 (the Invention):

A sample 105 of the invention was fabricated in the same manner as that for the sample 101, for which, however, the compound AP-1 was changed to AP-30 and BP-1 to BP-15.

(6) Fabrication of Sample 106 (Comparative Example):

A polyester film (Lumirror, trade name by Toray) having a thickness of 6.0 μm was used as a support film. A heat-resistant slip layer (thickness 1 μm) was formed on the back of the film, and to its surface, yellow, magenta and cyan compositions mentioned below were applied each as single color (coating amount of the dry film, 1 g/m$^2$).

Yellow Ink:

| | |
|---|---|
| Dye (Macrolex Yellow 6G, trade name by Bayer) | 5.5 mas. pts. |
| Polyvinyl butyral | 4.4 mas. pts. |
| (Eslec BX-1, trade name by Sekisui Chemical Industry) | |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polyvinyl butyral | 4.4 mas. pts. |
| (Eslec BX-1, trade name by Sekisui Chemical Industry) | |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polyvinyl butyral | 4.4 mas. pts. |
| (Eslec BX-1, trade name by Sekisui Chemical Industry) | |
| Methyl ethyl ketone/toluene (1/1 by mass) | 90 mas. pts. |

(7) Fabrication of Sample 107 (Comparative Example):

An ink sheet of Example 2 described in Japanese Patent 3263138 was fabricated.

(8) Fabrication of Sample 108 (Comparative Example):

An ink sheet of Example 10 described in JP-A 7-32742 was fabricated.

(Fabrication of Image-Receiving Sheet 1)

The surface of a paper support double-laminated with polyethylene was processed for corona discharge treatment, and then a sodium dodecylbenzenesulfonate-containing gelatin undercoat layer was formed on it. On this, a coating composition A for interlayer mentioned below was applied, using a bar coater, and dried, and then a coating composition A for receiving layer mentioned below was applied, using a bar coater, and dried. The bar coating was attained at 40° C., and the drying was attained at 50° C. for 16 hours for every layer. The layer formation by coating was so controlled that the dry coating amount of the interlayer A could be 1.0 g/m² and that of the receiving layer A could be 2.5 g/m². The process gave an image-receiving sheet 1.

Coating Composition A for Interlayer:

| | |
|---|---|
| Polyester resin (Vylon 200, trade name by Toyobo) | 15 mas. pts. |
| Fluorescent brightener | 1 mas. pt. |
| (Uvitex OB, trade name by Ciba-Geigy) | |
| Titanium oxide | 30 mas. pts. |
| Methyl ethyl ketone/toluene (1/1 by mass) | 90 mas. pts. |

Coating Composition A for Image-Receiving Layer:

| | |
|---|---|
| Polyester resin | 95 mas. pts. |
| (resin described in Example 1 in JP-A 2-265789) | |
| Amino-modified silicone | 5 mas. pts. |
| (Shin-etsu Chemical Industry's trade name, X-22-3050C) | |
| Epoxy-modified silicone | 5 mas. pts. |
| (Shin-etsu Chemical Industry's trade name, X-22-300E) | |
| Methyl ethyl ketone/toluene (1/1 by mass) | 400 mas. pts. |

(Image Formation)

The above ink sheets and the image-receiving sheet 1 were processed so as to be charged in a FUJIFILM's printer, ASK2000 (trade name). Set in the printer to obtain a highest density, these were tested for image outputting according to a high-speed print mode to give a black solid image.

(Evaluation)

(1) Relative Transfer Density Evaluation:

The visual density of the black image obtained under the above condition was determined, using Photographic Densitometer (trade name by X-Rite Incorporated). Table 1 below shows the relative value of the transfer density of each sample, based on the standard value 100 of sample 106.

(2) Ink Stickiness Evaluation:

For evaluation of ink stickiness, the print part giving Dmax of the image was checked for the ink stickiness condition, according to the following criteria. The results are show in Table 1.

Evaluation Rank:

5: The image-receiving sheet smoothly peeled from the ink sheet, with no ink fusion (stickiness) to the image receiving sheet.

4: The area where the two stuck to each other was at most 1% relative to the print area of the density region that was sticky.

3: The area where the two stuck to each other was more than 1% and at most 10% relative to the print area of the density region that was sticky.

2: The area where the two stuck to each other was more than 10% and at most 20% relative to the print area of the density region that was sticky.

1: The area where the two stuck to each other was more than 20% relative to the print area of the density region that was sticky.

(3) Background Soiling Evaluation:

The thermal transfer ink sheet and the image-receiving sheet were put one upon another in such a manner that the dye layer and the image-receiving layer could face each other, and this was led to pass through a hot roll laminator so that the surface temperature of the thermal transfer ink sheet could be 75° C., and then the density of the dye transferred to the dye-receiving layer was measured with Photographic Densitometer (by X-Rite Incorporated). Before and after the test, the density change ($\Delta D$) was computed. The results are shown in Table 1.

(4) Toe Gradation Evaluation:

In the same manner as in the above image formation, a gray gradation image having a QL value of from RGB 225 to 0 was outputted, using a printer ASK2000. In the sample outputted with the ink sheet of Sample 106, the QL value to have a density of C (cyan), M (magenta) and Y (yellow) of 0.20 was defined as a standard. At the same QL value, the density of C, M and Y of each sample of Examples was measured, and the toe gradation was evaluated on the basis of the density average value of the three colors C, M and Y. The density was measured with Photographic Densitometer (by X-Rite Incorporated) in the same manner as in the above relative transfer density evaluation. The results are shown in Table 1.

TABLE 1

| | Relative Transfer Density | Ink Stickiness | Background Soiling | Toe Gradation |
|---|---|---|---|---|
| Sample 101 (Example of the Invention) | 110 | 5 | 0.04 | 0.02 |
| Sample 102 (Example of the Invention) | 115 | 5 | 0.03 | 0.03 |
| Sample 103 (Example of the Invention) | 110 | 5 | 0.04 | 0.03 |
| Sample 104 (Example of the Invention) | 105 | 5 | 0.04 | 0.02 |
| Sample 105 (Example of the Invention) | 110 | 5 | 0.03 | 0.03 |
| Sample 106 (Comparative Example) | 100 | 5 | 0.10 | 0.20 |
| Sample 107 (Comparative Example) | 100 | 4 | 0.05 | 0.22 |
| Sample 108 (Comparative Example) | 100 | 5 | 0.09 | 0.21 |

As is obvious from the results in Table 1, the background of the samples 106 and 108 was much soiled. The background of the sample 107 was not so much soiled, but the toe gradation thereof was not lowered.

It is known that the samples 101 to 105 of the invention all had a high relative transfer density with no ink stickiness and their background was prevented from being soiled and the density of the toe gradation part was lowered. Accordingly, using the specific resin binder in the invention makes it possible to provide a thermal transfer ink sheet of high sensitivity with few surface defects.

Example 2

Samples were fabricated and evaluated in the same manner as in Example 1, for which, however, the image-receiving sheet 1 was changed to an image-receiving sheet 2 mentioned below.

(Fabrication of Image-Receiving Sheet 2)

The surface of a paper support double-laminated with polyethylene was processed for corona discharge treatment, and then a sodium dodecylbenzenesulfonate-containing gelatin undercoat layer was formed on it. On this, a coating composition B for interlayer and a coating composition B for image-receiving layer both mentioned below were laminated by coating in that order from the support, according to the method illustrated in FIG. 9 in U.S. Pat. No. 2,761,791. Immediately after the coating, this was dried at 50° C. for 16 hours. The layer formation was so controlled that the dry coating amount of the interlayer B could be 1.0 g/m² and that of the receiving layer B could be 2.5 g/m². The process gave an image-receiving sheet 2.

Coating Composition B for Interlayer:

| | |
|---|---|
| Hollow polymer latex (MH5055, trade name by Nippon Zeon) (aqueous dispersion of hollow-structure polymer having an outer diameter of 0.5 μm) | 561 mas. pts. |
| Gelatin | 120 mas. pts. |

Coating Composition B for Receiving Layer:

| | |
|---|---|
| Polymer P-7 | 50 mas. pts. |
| Benzotriazole-type UV absorbent polymer latex (ULS1700, trade name by Ipposha Yushi Kogyo) | 15 mas. pts. |
| Montan wax (J537, trade name by Chukyo Yushi) | 10 mas. pts. |

(Image Formation)

In the same manner as in Example 1 but using the image-receiving sheet 2, the ink sheets of Example 1 were tested and evaluated for image formation. The results are shown in Table 2.

TABLE 2

| | Relative Transfer Density | Ink Stickiness | Background Soiling | Toe Gradation |
|---|---|---|---|---|
| Sample 201 (Example of the Invention) | 115 | 5 | 0.04 | 0.03 |
| Sample 202 (Example of the Invention) | 120 | 5 | 0.03 | 0.03 |
| Sample 203 (Example of the Invention) | 115 | 5 | 0.05 | 0.02 |
| Sample 204 (Example of the Invention) | 110 | 5 | 0.05 | 0.03 |
| Sample 205 (Example of the Invention) | 115 | 5 | 0.03 | 0.02 |
| Sample 206 (Comparative Example) | 100 | 5 | 0.11 | 0.20 |
| Sample 207 (Comparative Example) | 95 | 4 | 0.06 | 0.21 |
| Sample 208 (Comparative Example) | 100 | 5 | 0.09 | 0.22 |

Also in this Example, the samples 201 to 205 of the d invention had a reduced toe gradation, and their relative transfer density was higher than that in Example 1.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 226267/2007 filed on Aug. 31, 2007, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A thermal transfer ink sheet having, as provided on a support, a dye layer containing a thermo-transferable dye in a resin binder, wherein the dye layer contains at least one polyvinyl acetal modified with a compound represented by the following formula [1], and at least one polyvinyl acetal modified with a compound represented by the following formula [2]:

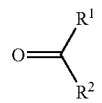

Formula [1]

wherein $R^1$ represents a substituted linear alkyl group, a substituted branched alkyl group, or a substituted or unsubstituted cyclic group; $R^2$ represents a hydrogen atom, a substituted or unsubstituted linear alkyl group, a substituted or unsubstituted branched alkyl group, or a substituted or unsubstituted cyclic group;

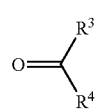

Formula [2]

wherein $R^3$ represents a linear hydrocarbon group having from 2 to 50 carbon atoms, or a branched hydrocarbon group having from 2 to 50 carbon atoms; $R^4$ represents a hydrogen atom, a linear hydrocarbon group having from 1 to 8 carbon atoms, or a branched hydrocarbon group having from 1 to 8 carbon atoms.

2. The thermal transfer ink sheet according to claim 1, wherein any one of $R^3$ and $R^4$ in formula [2] is a linear hydrocarbon group having from 3 to 20 carbon atoms or a branched hydrocarbon group having from 3 to 20 carbon atoms.

3. The thermal transfer ink sheet according to claim 1, wherein any one of $R^3$ and $R^4$ in formula [2] is a linear hydrocarbon group having from 3 to 8 carbon atoms or a branched hydrocarbon group having from 3 to 8 carbon atoms.

4. An ink cartridge filled with the thermal transfer ink sheet of claim 1.

5. A thermal transfer recording method for image formation on an image-receiving sheet having, on a support, a polymer latex-containing ink-receiving layer, which comprises applying heat to the thermal transfer ink sheet of claim 1.

6. A coating composition for dye layer of thermal transfer ink sheet, containing a thermo-transferable dye, at least one polyvinyl acetal modified with a compound represented by the following formula [1], and at least one polyvinyl acetal modified with a compound represented by the following formula [2]:

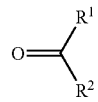

Formula [1]

wherein $R^1$ represents a substituted linear alkyl group, a substituted branched alkyl group, or a substituted or unsubstituted cyclic group; $R^2$ represents a hydrogen atom, a substituted or unsubstituted linear alkyl group, a substituted or unsubstituted branched alkyl group, or a substituted or unsubstituted cyclic group;

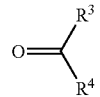

Formula [2]

wherein $R^3$ represents a linear hydrocarbon group having from 2 to 50 carbon atoms, or a branched hydrocarbon group having from 2 to 50 carbon atoms; $R^4$ represents a hydrogen atom, a linear hydrocarbon group having from 1 to 8 carbon atoms, or a branched hydrocarbon group having from 1 to 8 carbon atoms.

* * * * *